Aug. 26, 1924.

D. A. PICKENS 1,506,717

TRUCK HANGER

Filed April 13, 1923

Inventor

Davis A. Pickens.

By

Attorney

Patented Aug. 26, 1924.

1,506,717

UNITED STATES PATENT OFFICE.

DAVIS ANDREW PICKENS, OF JACKSON, MISSISSIPPI.

TRUCK HANGER.

Application filed April 13, 1923. Serial No. 631,882.

*To all whom it may concern:*

Be it known that I, DAVIS A. PICKENS, residing at Jackson, in the county of Hinds and State of Mississippi, a citizen of the United States, have invented certain new and useful Improvements in Truck Hangers, of which the following is a specification, reference being had to the accompanying drawing, forming a part thereof.

My invention relates to truck hangers and has for its object to provide a simpler device by which a truck or other element may be readily suspended from a bolster or other element of a car body above the truck, and which will be readily adjustable for different lengths and will be adapted to be readily and quickly put in place or removed.

With these objects and other objects hereinafter explained in view my invention consists in the construction hereinafter described and claimed.

Referring to the drawings.

Figure 1:
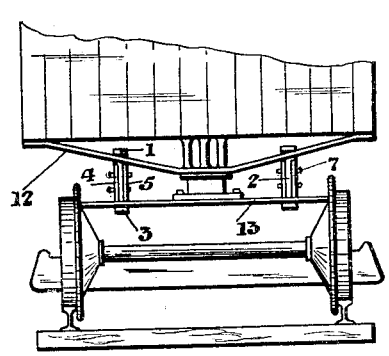
Figure 1 is an end view of a car showing my truck hanger in position to support a truck from the body bolster.
Figure 2:
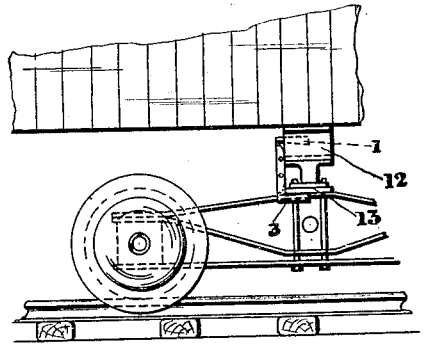
Figure 2 is a similar view from the side of the car.
Figure 3:
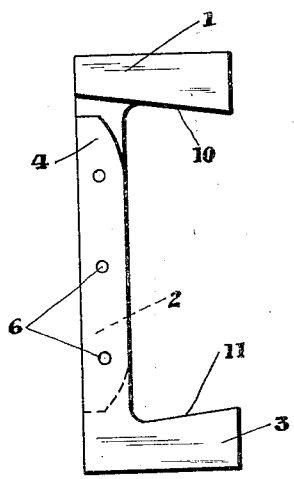
Figure 3 is a side view of a truck hanger embodying my invention.
Figure 4:
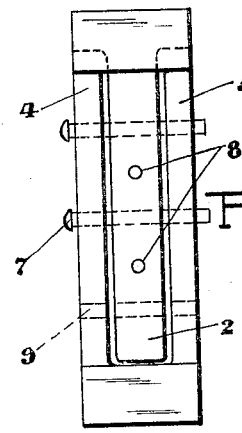
Figure 4 is a front view of the same.

In the drawings 1 indicates the head of the upper member of the truck hanger, having formed integrally therewith the depending arm 2. 3 indicates the head of the lower member of the hanger having formed integral therewith the upwardly extending arms 4 and 5. The depending arm 2 is substantially rectangular in cross section and is adapted to fit loosely between the arms 4 and 5 of the lower member. Through the arms 4 and 5 are formed a series of holes 6 at suitable distances apart adapted to receive pins 7. The depending arm 2 of the upper member is provided with holes 8 extending at right angles to the direction of the head 1 and is also provided with holes 9 at right angles to the direction of the holes 8. The holes 8 and 9 are adapted to receive the pins 7.

The head 1 preferably has its under face inclined downward as shown at 10 and the head 3 preferably has its upper face inclined upward as shown at 11 so as to give the heads somewhat of a hook construction.

The holes 6 in the arms 4 and 5 and the holes 8 and 9 in the arm 2 are preferably spaced apart regular distances.

In the use of the device the pins 7 being withdrawn, the head 1 of the upper member may be hooked over the body bolster 12 and the head 3 of the lower member may be engaged beneath the lower edge of the truck bolster 13. The arms 2 of the upper member and the arms 4 and 5 of the lower member are then brought into line with the arm 2 between the arms 4 and 5. One or more of the pins 7 are then inserted through the holes 6 and 8 (or 9) and the device forms a hanger for the truck bolster supporting it firmly in position so that the wheels or axles may be removed or repairs made.

The head 1 and arm 2 are preferably formed in one piece by forging or it may be by casting or suitable metal or may be cut from a solid piece of metal and the head 3 and the arms 4 and 5 may be similarly formed.

While the device is particularly adapted for use as a truck hanger in the manner described it may be used for many other purposes and will be found useful wherever two elements are to be held from separating a distance greater than the distance between the heads 1 and 3. This distance will depend upon which of the holes in the arm 2 is brought in line with the hole 6 of the arms 4 and 5 as will be readily understood.

The head 1 may be arranged at right angles to the head 3 and the holes 9 of the arm 2 utilized to receive the pins 7 the device in this arrangement being adapted to hang a lower element from an upper element when the two elements are at right angles one to the other.

Having thus described my invention what I claim is:—

In a truck hanger the combination of an upper member comprising a forwardly extending head and an arm depending from its rear portion having a series of holes formed therein and a lower member comprising a forwardly extending head and a pair of arms extending upward from its rear portion having a series of holes formed therein and pins extending through the holes in the depending arm of the upper member and the holes in the upwardly extending arms of the lower member, for securing the upper and lower members together.

In testimony whereof I hereunto affix my signature.

DAVIS ANDREW PICKENS.